2,756,155

INDIVIDUAL FREEZING OF EGGS

Cedric Hale, Glen Ellyn, and Carl H. Koonz, Chicago, Ill., assignors to Swift & Company, Chicago, Ill., a corporation of Illinois No Drawing. Application November 3, 1952,
Serial No. 318,529

5 Claims. (Cl. 99—196)

The present invention relates in general to an improvement in the preservation of eggs and more particularly to an improvement in the preservation of packaged fresh eggs by freezing, whereby said fresh eggs are maintained in their original fresh condition for an indefinite period of time.

It is essential to preserve eggs which are to be stored for future consumption so as to prevent bacterial growth and the resulting putrefaction of the egg material. The growth of bacteria results in the egg material possessing a distasteful flavor and undesirable color which creates an adverse psychological effect upon the consumer, thereby resulting in decreased sales. This is true even if the eggs are not spoiled to the extent of being inedible. Bacterial growth also results in the generation of foul smelling gases, such as mercaptans and other sulfur gases, which are released when the egg is opened. It is also desirable to preserve eggs so as to prevent embryonic development, as a considerable number of eggs that are placed on the market today are fertile.

Heretofore eggs have been preserved in many different ways. Chemical preservatives have been utilized but in general have not been too desirable due to the possibility of the egg material becoming toxic, and also because such preservatives are not always legally permitted. Eggs have also been preserved by quick-freezing in bags or cases of transparent film material. In each instance, the egg has been frozen at a temperature approximating 0° F. or below resulting in the egg yolk having a rubbery and tough consistency and being generally undesirable for human consumption.

It is therefore an object of the present invention to provide a method of preserving fresh eggs which overcomes these prior art difficulties.

Another object of the present invention is to provide a method of preserving fresh eggs by freezing whereby the egg yolk is maintained in a fresh condition for an indefinite period of time.

An additional object of the invention is to inhibit bacterial growth in shelled whole eggs.

Additional objects, if not specifically set forth herein will be apparent to one skilled in the art from the following detailed description:

Broadly, the present invention comprises freezing liquid whole eggs at a temperature not lower than 22° F.

More specifically, the present method is carried out by breaking the egg shell, removing the egg therefrom and thereafter placing the whole egg into a container. This container is preferably a small case, bag, or envelope, manufactured from a transparent, heat-sealable film material and of a capacity slightly larger than the mass of a single egg. The container is then sealed and the packaged egg is frozen at a temperature not lower than 22° F., for example between 22°–27° F., and preferably between 22° and 25° F.

It is undesirable to use temperatures below 22° F., as it has been found that subjecting the packaged product to a temperature below 22° F. results in the egg yolk attaining a rubbery consistency as well as becoming tough and possessing undesirable eating qualities.

It is to be noted that the essential feature of the present invention resides in freezing whole eggs at a temperature not lower than 22° F. Bacterial growth is inhibited and the whole eggs are maintained in a fresh and edible condition by freezing in this manner. The shell-free whole eggs are packaged in individual containers to prevent evaporation and to enable the consumer to inspect the eggs before making a purchase.

The egg should be deposited in the container with its yolk unbroken. This can best be accomplished by using care in breaking the shell and in placing the egg in a container having the end in an open and expanded condition and entirely free from any obstructions. If the yolk of an egg is broken in positioning the egg within the container, the package is often unusable and must be discarded. The whole eggs must be kept in their original form so that they can be fried or separated by the housewife for baking purposes. Also caution should be taken to see that particles of shell material do not pass into the container along with the egg.

If larger size containers are utilized in carrying out the present invention, and more than one egg is placed therein, the undesirable condition of two or more eggs running together and thereby freezing in a unified mass confronts the consumer. Thus if the consumer desires to utilize only a single egg for a particular purpose, he would either have to thaw several eggs and then repackage and refreeze the particular eggs he did not utilize, or he would be forced to separate the desired frozen egg by physical means which is rather difficult to accomplish.

Heat-sealable film material is the preferred packaging material as sealing of the containers on a commercial basis may be more advantageously and efficiently carried out by the application of heat to the film material. This is particularly true if the containers are made from cellophane, rubber hydrochloride (commonly sold under the trademark "Pliofilm"), or polyethylene. With some film materials, the containers may be closed by electronic sealing. Although heat-sealing is the preferred method of making the container closure, the container may be sealed by the application of glue or similar adhesives. To accomplish the heat-sealing, any conventional heat-sealing apparatus known to those skilled in the packaging art, such as an iron or press, may be utilized. It is essential to merely seal the container so as to prevent evaporation of any portion of the egg material.

The shells of the eggs may be broken either by hand or by an egg-shell breaking apparatus. Obviously, in commercial production the egg-shell breaking apparatus would be more efficient and desirable. There are different eggshell breaking apparatus in current use and it is discretionary with one skilled in the art as to the particular apparatus to use.

The frozen product may be stored for an indefinite period of time without deleterious effects to the egg material. The egg material possesses its original fresh, agreeable and palatable flavor and appearance upon being thawed and utilized.

The frozen product before use may either be thawed at room temperature or may be subjected to a warm liquid medium to accelerate the thawing process. It is not necessary to remove the frozen product from the container prior to thawing. The frozen product is simply allowed to stand at room temperature for a short period of time or is placed in warm water until thawed and is then removed from its container and used as desired.

Obviously, many modifications and variations of the invention as hereinbefore set forth may be made without departing from the spirit and scope thereof, and therefore only such limitations should be imposed as are indicated in the appended claims.

We claim:

1. In the method of preserving fresh eggs, the steps which comprise: freezing shelled whole eggs with yolk intact in a sealed container at a temperature not lower than 22° F., and keeping the eggs in the frozen state at a temperature not lower than 22° F. during subsequent storage and handling operations.

2. In the method of preserving fresh eggs the steps which comprise: freezing the shelled whole egg with the yolk intact in a sealed container at a temperature range of about 22° to about 27° F., and keeping the egg in the frozen state at a temperature not lower than 22° F. during subsequent storage and handling operations.

3. In the method of preserving fresh eggs the steps which comprise: freezing the shelled whole egg with the yolk intact in a sealed container at a temperature of about 25° F., and keeping the egg in the frozen state at a temperature not lower than 22° F. during subsequent storage and handling operations.

4. The method of preserving fresh eggs which comprises: breaking the egg shells, removing the eggs from their shells and placing a single egg with the yolk intact in a container, sealing the container containing a single egg, freezing the egg-containing container at a temperature not lower than about 22° F., and keeping the egg in the frozen state at a temperature not lower than 22° F. during subsequent storage and handling operations.

5. The method of preserving fresh eggs which comprises: breaking the egg shells, removing the eggs from their shells and placing a single egg with the yolk intact in a container, sealing the container containing a single egg, freezing the egg-containing container at a temperature range of about 22° to 25° F., and keeping the egg in the frozen state at a temperature not lower than 22° F. during subsequent storing and handling operations.

References Cited in the file of this patent

UNITED STATES PATENTS

| | | |
|---|---|---|
| 1,137,761 | Keith | May 4, 1915 |
| 1,398,860 | Hussey | Nov. 29, 1921 |
| 2,525,096 | Damuth | Oct. 16, 1950 |
| 2,593,308 | Jensen et al. | Apr. 15, 1952 |

OTHER REFERENCES

"The Structure And Composition Of Foods" 1937, by Winton, Vol. III, published by John Wiley & Sons, Inc., New York, page 260.

"The Freezing Preservation Of Foods" 1947, by Tressler, Second Edition, published by The Avi Publishing Co., Inc., New York, pages 634 to 637.